United States Patent [19]

Billings et al.

[11] 4,278,718

[45] Jul. 14, 1981

[54] SEALING COMPOSITIONS FOR MINIMIZING SOLUBLE IRON MIGRATION

[75] Inventors: Charles A. Billings, Concord; Robert H. Hofeldt, Littleton, both of Mass.

[73] Assignee: W. R. Grace & Co., Cambridge, Mass.

[21] Appl. No.: 111,313

[22] Filed: Jan. 11, 1980

[51] Int. Cl.³ .................. B32B 3/02; B32B 27/20; B32B 27/22; B32B 27/30
[52] U.S. Cl. ................... 428/64; 260/23 EP; 260/23 XA; 260/30.6 R; 260/31.6; 260/31.8 R; 260/31.8 B; 260/31.8 C; 260/32.2; 260/33.6 UA; 260/42.49; 427/388.5; 428/463; 428/469; 428/471; 428/472
[58] Field of Search ........... 260/42.49, 31.8 R, 23 EP, 260/31.8 B, 31.8 C, 31.6, 33.6 UA; 427/388 D; 428/64, 463, 469, 471, 472

[56] References Cited

U.S. PATENT DOCUMENTS

| | | | |
|---|---|---|---|
| 2,716,092 | 8/1955 | Leistner . | |
| 3,131,081 | 4/1964 | Husum | 427/388.5 |
| 3,171,560 | 3/1965 | Desch et al. . | |
| 3,555,122 | 1/1971 | Simons . | |
| 3,557,030 | 1/1971 | Simons . | |
| 3,562,191 | 2/1971 | Glessier . | |
| 3,563,936 | 2/1971 | Merrill et al. . | |
| 3,695,477 | 10/1972 | Edmonston et al. . | |
| 3,696,956 | 10/1972 | Merrill et al. . | |
| 3,751,525 | 8/1973 | Brenner et al. . | |
| 3,917,550 | 11/1975 | Clas et al. | 260/42.49 |
| 3,931,909 | 1/1976 | Dalli et al. . | |
| 3,941,737 | 3/1976 | Horstkorte et al. | 260/42.49 |
| 3,957,723 | 5/1976 | Lawson et al. | 260/42.49 |
| 3,983,086 | 9/1976 | Dickens, Jr. | 260/42.49 |
| 4,010,138 | 3/1977 | Ejk et al. . | |
| 4,041,014 | 8/1977 | Mack . | |
| 4,058,471 | 11/1977 | Gatti et al. | 260/42.49 |
| 4,124,139 | 11/1978 | Benno . | |
| 4,134,517 | 1/1979 | Rhoades . | |
| 4,134,857 | 1/1979 | Bradley et al. . | |
| 4,155,480 | 5/1979 | Debenham et al. . | |

*Primary Examiner*—Allan Lieberman
*Attorney, Agent, or Firm*—C. Edward Parker; David L. Weinstein

[57] ABSTRACT

Composition and method for sealing containers containing vegetable based beverages, i.e. beer, ale, wine, fruit and vegetable juices.

15 Claims, No Drawings

SEALING COMPOSITIONS FOR MINIMIZING SOLUBLE IRON MIGRATION

BACKGROUND OF THE INVENTION

In the manufacturing or processing of a number of vegetable base beverages, notably beer, ale, wine and fruit and vegetable juices the beverage is filtered one or more times to remove certain deleterious materials. For example, see U.S. Pat. No. 4,134,857 entitled "Use of Tannic or Gallic Acid to Produce Low Beverage Soluble Iron Content Filter Aid". It is desirable to control the presence of beverage soluble iron since beverage soluble iron can be deleterious to the taste and long term stability (shelf-life) of the beverage.

The problem of beverage soluble iron migration into the pack may occur in any pack containing an acid system. The problem may be especially critical in cans and bottles containing beer. As little as 60 parts per billion iron may effect the taste of beer. It has also been recognized, that though the taste of beer is not affected, the presence of beverage soluble iron may cause the beer to be cloudy and thus unacceptable from the consumer's point of view.

The beverages mentioned above may be packaged in either cans or bottles. In either case the beverage pack may come in contact with the container or the sealing materials used in manufacturing the container where beverage soluble iron may be present. In the case of bottles, the metal or sealing material with which the beverage pack comes in contact with is the closure which may be either a crown closure or a roll-on type closure. In the closure or cap there is provided an annular sealing gasket on the interior surface to provide a seal between closure and the bottle.

Over the years can manufacturers have been providing metal containers for packaging beer. These containers may be either an aluminum can, a coated steel can, or a combination thereof. Recent technology development has provided easy open ends and ecology ends for cans having pressurized contents. For example see U.S. Pat. Nos. 4,124,139; 4,134,517 and particularly U.S. Pat. No. 3,931,909. U.S. Pat. No. 3,931,909 teaches the use of sealants based on polyvinyl chloride to seal the partially severed opening.

Easy open beer ends ecology ends are made from organic enamel coated electrolytic chromium coated steel and are made by partially cutting openings through the steel and resealing the partially cut openings with a plastisol sealing material. For the most part the organic enamel coating provide an excellent barrier to corrosion. The sealant is designed to provide a mechanical seal in the partially cut opening or scored areas and provide a gas and liquid seal and still be easily torn so that the container may be opened.

The pack environment is such that the acid beverage comes in contact with the container walls and the sealing materials therein. Any beverage soluble iron on the container walls or in the sealing materials may be leached into the pack under certain conditions. Certainly the most likely sources of iron contamination would be the scored steel ends in the case of acid pack beverages packaged in cans and the steel crown caps in the case of acid pack beverages packaged in glass or plastic containers.

SUMMARY OF THE INVENTION

It is the purpose of this invention to inhibit the iron migration from sources of beverage soluble iron that may come in contact with the beverage during the storage thereof. Inhibiting the beverage soluble iron pickup is accomplished with a sealing composition specifically formulated to inhibit beverage soluble iron migration.

The invention herein is a composition and method for improving the iron migration resistance from the container or the sealing materials therein into the beverage pack. The novel sealing composition for inhibiting iron migration in acid packs consists essentially of a vinyl chloride resin, a plasticizer for the resin and the improvement therein comprising from about 0.1 to about 50 parts or more parts of a metal oxide per hundred parts resin.

DETAILED DESCRIPTION AND PREFERRED EMBODIMENTS

The sealing composition of this invention consists essentially of a vinyl chloride resin, between about 50 to about 300 parts plasticizer per 100 parts resin and from about 0.1 to about 50 parts of a metal oxide per 100 parts resin.

In a preferred embodiment the sealing composition will also contain a quantity of filler material up to about 700 parts of filler per 100 parts resin. Other ingredients that may be found in the sealing composition include stabilizers and sequestering agents.

The inventors have found that the critical feature of the novel sealing composition is the presence of a hereinafter named metal oxide incorporated into the plastisol. The metal oxide is believed to act as an acid scavenger. Thus, it would prevent the formation of hydrochloric acid within the plastisol sealing material which could attack the substrate or other materials in the vicinity thus releasing beverage soluble iron. Also, it is believed that the presence of the metal oxide inhibits the formation of iron soluble salts which would result by chemical reaction of acids present in the beverage with the substrate or other iron containing materials in the vicinity.

It has been found that powdered or flaked metal in the sealing composition will not act to inhibit the iron migration in acid packs. The applicants have tried metals such as aluminum and magnesium, and it appears that these metals actually increase the formation of the soluble iron. It is believed that the residual chloride in the vinyl chloride resin forms chloride salts with these flake or powered metals and may catalyze the formation of soluble iron salts. It was therefore surprising to find that metal oxides would inhibit the formation of beverage soluble iron.

The preferred metal oxides for use in the sealing compositions of this invention include aluminum oxide, zinc oxide, magnesium oxide and calcium oxide. Other metal oxides that may be used include copper oxide, silver oxide, nickel oxide, chromium oxide and titanium dioxide.

The level of metal oxide in the plastisol sealing composition may range from about 0.1 to 50 parts of metal oxide per 100 parts resin. More than 10 parts of metal oxide per 100 parts resins may be used but no increase in effectiveness is apparent. The preferred level or range is from about 0.1 to about 5 parts metal oxide per 100 parts resin.

As indicated above, fillers may also be included in the sealing compositions in a quantity up to about 700 parts per 100 parts resin. Preferably the filler material will range up to about to 400 parts per 100 parts resin. The preferred fillers include natural barium sulfate(barytes), talc (a natural hydrous magnesium silicate), calcium carbonate, and mixtures of barium sulfate with either talc or mica. Other fillers that may be incorporated into the sealing composition include, clay (diatomaceous earth), magnesium silicate, calcium silicate, calcium sulfate, titanium dioxide, and zinc carbonate. Calcium carbonate coated with calcium stearate may also be used as a filler.

The plasticizer employed in the invention should be capable of dissolving the vinyl chloride resin when heated and remain completely compatible with the resin upon cooling. Illustrative plasticizers include dialkyl phthalates such as dioctyl phthalate (i.e. di-2-ethylhexyl phthalate) and octyl decyl phthalate; alkyl phthalyl alkyl glycolates, such as ethyl phthalyl ethyl glycolate and butyl phthalyl glycolate; dialkyl esters of alkane dicarboxylic acids, such as diisobutyl adipate, di-2-ethylhexyl adipate and dibutyl sebacate; acetyl trialkyl citrates, such as acetyl tributyl citrate, and trialkyl and triaryl phosphates, such as trioctyl phosphate, 2-ethylhexyl diphenyl and tricresyl phosphate. Other useful plasticizers include alkyl esters of fatty acids such as octyl stearate; epoxidized triglycerides such as epoxidized soybean oil and polymeric polyester plasticizers such as polymeric glycol adipate. White oil may also be used as a plasticizer. The preferred plasticizers are di-2-ethylhexyl phthalate and diisodecyl phthalate. Plasticizers may be used at a level from about 50 to about 300 per 100 parts resin and preferably from about 60 to 200 parts per 100 parts resin.

Stabilizers may also be added to the vinyl chloride plastisol as required. These stabilizers include the zinc, calcium and aluminum stearates. Other stabilizers include zinc octoate, and tin octoate. Preferably a commercially available calcium-zinc stearate is used along with epoxidized soybean oil. Stabilizers may be included in the composition at moderate levels from 0 to about 10 parts and preferably from about 2 to about 5 parts per 100 parts resin.

Sequestering agents are not normally used in plastisol composition of the type described herein. However, sequestering agents such as dibutylamine pyrophosphate etc., may be included. Other suggested sequestering agents are gluconic acid and the salts thereof, phosphate and phosphate salts, and citric acid and salts thereof. Sequestering agents may be used in the range of from 0 to about 5 and preferably from 0 to about 0.5 parts per 100 parts resin.

Antioxidants may also be used in the range of 0 to about 2 and preferably from 0 to about 0.5 parts per 100 parts resin. Suggested antioxidants are tocopherols (Vitamin E), butylated hydroxy toluene (BHT), 2,2'methylene-bis[6-(1-methylcyclohexyl)-p-cresol], and di-$\beta$-naphthyl-p-phenylenediamine.

Viscosity modifiers may be used in the sealing composition where desired. From 0 to about 25 and preferably, from about 2 to about 18 parts of a viscosity modifier per 100 parts resin will be used. Suitable viscosity modifiers include paraffin wax, commercial soaps such as Disperplast I from BYK-Mallinckrodt and Tween 60 from ICI, and colloidal silicas such as Cab-O-Sil M-5 from Cabot Corporation.

The terms "vinyl chloride polymer or resins" and "polyvinyl chloride" as used herein are generally emulsion grade polyvinyl chloride resins having molecular weights of more than about 10,000 and average particle sizes of less than about 10 microns. The terms as used herein are inclusive of not only polyvinyl chloride homopolymers of all types, but also of copolymers of vinyl chloride in a major portion such as copolymers of vinyl chloride copolymerized with less than 50% by weight of ethylenically unsaturated comonomer copolymerizable therewith. Ethylenically unsaturated comonomers copolymerizable with vinyl chloride include vinyl acetate, vinylidene chloride, maleic or fumaric acid esters, styrene and acrylonitrile. Minor portions of other synthetic resins such as chlorinated polyethylene, and copolymers of acrylonitrile, butadiene and styrene may be included.

The art has recognized that a significant advantage can be gained by admixing less-costly produced suspension-polymerized vinyl chloride resin with emulsion-polymerized resin. The use of blends of suspension-polymerized vinyl chloride resins and emulsion-polymerized vinyl chloride resins in plastisol compositions lowers the overall cost of the blend.

It may be desirable to employ a blend of emulsion grade vinyl chloride polymer and vinyl chloride polymer produced by mass polymerization, which blend is characterized by a low emulsifier content, crystal clarity after fluxing, good rheological properties and is capable of being molded and fluxed at relatively low temperatures. Thus the suspension polymerized resins and mass polymerized resins are sometimes collectively referred to as "blending" or "extender" resins.

In one embodiment the resin portion of the sealing compound may contain from about 10 to 100% emulsion (dispersion) polymerized resin and from about 10 to about 50% by weight of an extender resin. Container closure gaskets using the blend of vinyl chloride resins are described in U.S. Pat. No. 3,696,956. The description in specification of U.S. Pat. No. 3,696,956 is incorporated herein to the extent necessary to describe various methods of polymerizing vinyl chloride. Such methods include aqueous emulsion polymerized vinyl chloride resins, aqueous suspension or solution polymerized vinyl chloride resins, and mass or bulk-polymerized vinyl chloride resins.

The following specific examples are illustrative but not limitative of my invention, it being understood that similar improved results are obtainable with other combinations of the different ingredients of my new additive composition specified above. All such variations which do not depart from the basic concept of the invention and composition disclosed above are intended to come within the scope of the appended claims. Unless otherwise specified the quantity of the ingredients are given as based on one hundred parts of resin (phr). Iron concentration is given in parts per billion (ppb).

EXAMPLE I

Comparison of iron levels in commercial beer packs having plastisol-repaired, scored, steel ends. Standard plastisol formulation versus a similar material containing magnesium oxide.

| MATERIAL | Sample # | |
|---|---|---|
| | 53-1B (phr) | 45-5 (phr) |
| PVC resin - Diamond Shamrock | | |
| PVC-71AH homopolymer | 100 | 100 |
| Fillers | | |
| barytes | 250 | 250 |
| mica | 25 | 25 |
| titanium dioxide | 7.5 | 7.5 |
| Stabilizers | | |
| epoxidized soybean oil | 5 | 5 |
| calcium-zinc stearate | 2.5 | 2.5 |
| Plasticizer | | |
| dioctyl phthalate | 103 | 103 |
| Viscosity Modifiers | | |
| paraffin wax | 5 | — |
| commercial soap | — | 8 |
| Metal Oxide | | |
| magnesium oxide | none | 10 |
| Concentration of iron in packs in parts per billion (ppb) | 98 | 51 |
| Reduction in iron level (%) | — | 48 |

EXAMPLE II

Comparison of iron levels in beer packs in glass bottles having plastisol-repaired, scored, steel crowns. Comparison of metal oxides (magnesium oxide, aluminum oxide, zinc oxide and calcium oxide).

| MATERIAL | Sample # | | | |
|---|---|---|---|---|
| | 64-2 (phr) | 67-2 (phr) | 66-5 (phr) | 63-2 (phr) |
| PVC Resin | | | | |
| Diamond Shamrock PVC 71AH homopolymer | 100 | | | |
| Diamond Shamrock PVC 71 lower MW homopolymer | | 100 | | |
| Goodrich GEON 120 × 241 lower MW homopolymer | | | 100 | |
| Stauffer SCC-40 PVC - vinylacetate copolymer | | | | 100 |
| Fillers | | | | |
| barytes | 325 | 325 | 325 | 325 |
| titanium dioxide | 7.5 | 7.5 | 7.5 | 7.5 |
| Stabilizers | | | | |
| epoxidized soybean oil | 2.0 | 2.0 | 2.0 | 2.0 |
| zinc octoate | 2.5 | | | 2.5 |
| magnesium stearate | | 2.5 | 2.5 | |
| Plasticizers | | | | |
| dioctyl phthalate | 123 | 123 | 123 | 123 |
| Viscosity Modifier | | | | |
| paraffin wax | 2 | 2 | 2 | 2 |
| Sequestering Agent | | | | |
| calcium citrate | 0.5 | | | |
| calcium gluconate | | 0.5 | 0.5 | |
| sodium tartrate | | | | 5.0 |
| Metal Oxide | | | | |
| magnesium oxide | 5.0 | | | |
| aluminum oxide | | 5.0 | | |
| zinc oxide | | | 5.0 | |
| calcium oxide | | | | 5.0 |
| Concentration of Iron in the pack in parts per billion | 26 | 24 | 35 | 24 |

EXAMPLE III

Comparison of iron levels in beer packed in glass bottles having plastisol-repaired scored, steel crown. Comparison of some commercial fillers (barium sulfate, talc, clay and calcium carbonate).

| MATERIALS | Sample # | | | |
|---|---|---|---|---|
| | 64-2 (phr) | 64-3 (phr) | 64-4 (phr) | 64-5 (phr) |
| PVC Resin | | | | |
| Diamond Shamrock PVC 71AH homopolymer | 100 | 100 | 100 | 100 |
| Filler | | | | |
| barytes | 72* | | | |
| talc | | 70* | | |
| clay | | | 70* | |
| calcium carbonate | | | | 70* |
| Stabilizers | | | | |
| epoxidized soybean oil | 2.0 | 2.0 | 2.0 | 2.0 |
| zinc octoate | 2.5 | 2.5 | 2.5 | 2.5 |
| Plasticizer | | | | |
| dioctyl phthalate | 123 | 123 | 123 | 123 |
| Viscosity Modifier | | | | |
| paraffin wax | 2.0 | 2.0 | 2.0 | 2.0 |
| Sequestering agent | | | | |
| calcium citrate | 0.5 | 0.5 | 0.5 | 0.5 |
| Metal Oxide | | | | |
| magnesium oxide | 5.0 | 5.0 | 5.0 | 5.0 |
| Pigment | | | | |
| titanium dioxide | 7.5 | 7.5 | 7.5 | 7.5 |
| Concentration of Iron in the pack in parts per billion | 26 | 38 | 32 | 32 |

*Expressed as milliliters of filler per hundred grams of resin

EXAMPLE III(A)

Comparison of iron levels in commercial beer packs having plastisol-repaired, scored, steel ends. Comparison of commercial fillers (without added metal oxide).

| MATERIALS | Sample # | | | | |
|---|---|---|---|---|---|
| | 23-2 (phr) | 23-5 (phr) | 43-6 (phr) | 23-7 (phr) | 23-8 (phr) |
| PVC Resin | | | | | |
| Diamond Shamrock PVC 71AH homopolymer | 100 | 100 | 100 | 100 | 100 |
| Fillers | | | | | |
| barytes | 67* | 44* | 56* | | |
| talc | | 27* | | | |
| mica | | | 9* | | |
| calcium carbonated coated with calcium stearate | | | | 65* | |
| calcium carbonate | | | | | 65* |
| Stabilizer | | | | | |
| calcium zinc stearate | 1.0 | 1.0 | 1.0 | 1.0 | 1.0 |
| Plasticizer | | | | | |
| dioctyl phthalate | 102 | 102 | 102 | 102 | 102 |
| Pigment | | | | | |
| carbon black | 0.5 | 0.5 | 0.5 | 0.5 | 0.5 |
| Concentration of Iron in pack in parts per billion | 50 | 59 | 48 | 106 | 97 |

*expressed as milliliters of filler per 100 grams of resin

EXAMPLE IV

Comparison of iron levels in commercial beer packs having plastisol-repaired, scored, steel ends. Comparison of 2-diethylhexyl phthalate with two other commercial plasticizers (without added metal oxide).

| MATERIAL | Sample # | | | | | |
|---|---|---|---|---|---|---|
| | 23-2 (phr) | 24-1 (phr) | 24-2 (phr) | 24-3 (phr) | 24-4 (phr) | 24-5 (phr) |
| Resin | | | | | | |
| Diamond Shamrock PVC 71AH homopolymer | 100 | 100 | 100 | 100 | 100 | 100 |
| Fillers | | | | | | |
| barytes | 300 | 300 | 300 | 300 | 300 | 300 |

-continued

| MATERIAL | Sample # | | | | | |
|---|---|---|---|---|---|---|
| | 23-2 (phr) | 24-1 (phr) | 24-2 (phr) | 24-3 (phr) | 24-4 (phr) | 24-5 (phr) |
| Stabilizers | | | | | | |
| calcium-zinc stearate | 1.0 | 1.0 | 1.0 | 1.0 | 1.0 | 1.0 |
| Plasticizers | | | | | | |
| dioctyl phthalate | 102 | 2 | 2 | 2 | 82 | 82 |
| epoxidized soybean oil | — | 80 | 80 | — | — | 20 |
| di-2-ethylhexyl adipate | — | 20 | — | — | — | — |
| di-isodecyl phthalate | — | — | — | 100 | — | — |
| white oil | — | — | — | — | 20 | — |
| Pigment | | | | | | |
| carbon black | 0.5 | 0.5 | 0.5 | 0.5 | 0.5 | 0.5 |
| Concentration of iron in | | | | | | |
| packs in parts per billion | 50 | 228 | 230 | 71 | 67 | 47 |

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalent of the following claims.

What is claimed as new and desired to be secured by Letters Patent is:

1. A plastisol sealing composition for inhibiting iron migration in acid packs consisting essentially of a polyvinyl chloride resin, between about 50 and 300 parts by weight of a plasticizer for the resin per 100 parts of said resin and the improvement therein comprising from about 0.1 to about 50 parts by weight of a metal oxide iron migration inhibitor per 100 parts of said resin, said inhibitor being selected from the group consisting of aluminum oxide, zinc oxide, magnesium oxide, calcium oxide, copper oxide, silver oxide, nickel oxide, chromium oxide, and mixtures thereof.

2. The composition of claim 1 wherein the vinyl chloride resin is a homopolymer.

3. The composition of claim 1 wherein the polyvinyl chloride resin is a copolymer of vinyl chloride and vinyl acetate.

4. The composition of claim 1 wherein the polyvinyl chloride resin is an emulsion grade resin containing up to about 50% by weight of a polyvinyl chloride blending resin.

5. The composition of claim 2 or 3 wherein the plasticizer is selected from the group consisting of dioctyl phthalate, di-2-ethylhexyl adipate, di-isodecyl phthalate, di-isooctyl phthalate, epoxidized soybean oil, 2-ethylhexyl diphenyl phosphate, white oil and mixtures thereof.

6. The composition of claim 2 or 3 including from about 50 up to about 700 parts of filler per 100 parts of resin, said filler being selected from the group consisting of barium sulfate (barytes), talc, calcium carbonate, titanium dioxide, mica, clay (diatomaceous earth), calcium carbonated coated with calcium stearate, magnesium silicate, calcium silicate, calcium sulfate, zinc carbonate and mixtures thereof.

7. A container closure comprising a cap having deposited therein a resinous mass which functions as a gasket when the closure is in sealing relationship with the container and as an inhibitor to decrease iron migration from said cap and resinous mass, said resinous mass comprising a fluxed plastisol of a composition containing (a) 100 parts by weight of a polyvinyl chloride resin component selected from the group consisting of an emulsion grade polyvinyl chloride resin and an emulsion grade polyvinyl chloride resin admixed with up to about 50% by weight of a polyvinyl chloride blending resin, (b) from about 50 to about 300 parts of a plasticizer for said resin component per 100 parts of said resin component, and the improvement comprising, (c) an iron migration inhibiting amount of a metal oxide selected from the group consisting of aluminum oxide, zinc oxide, magnesium oxide, calcium oxide and mixtures thereof.

8. The container closure of claim 7 wherein said resinous mass includes from about 200 to about 400 parts of a filler selected from the group consisting of barium sulfate (barytes) talc, calcium carbonate, titanium dioxide, mica, clay, calcium carbonate coated with calcium stearate and mixtures thereof per 100 parts of resin.

9. The container closure of claim 8 wherein the plasticizer is selected from the group consisting of dioctyl phthalate, di-2-ethylhexyl adipate, di-isodecyl phthalate, di-isooctyl phthalate, epoxidized soybean oil, 2-ethylhexyl diphenyl, phosphate white oil and mixtures thereof.

10. A method for improving the iron migration resistance of plasticized vinyl chloride polymer composition consisting essentially of (a) a vinyl chloride homopolymer or a copolymer wherein at least 50% of the repeating units are derived from vinyl chloride, the remaining repeating units being derived from one or more ethylenically unsaturated compounds which are copolymerizable with vinyl chloride, (b) between about 50 and 300 parts by weight of a plasticizer for vinyl chloride polymers per 100 parts of said homopolymer or copolymer, the method comprising (1) adding to said polymer composition between about 0.1 to about 50 parts of a metal oxide per 100 parts of homopolymer or copolymer, said metal oxide being selected from the group consisting of aluminum oxide, zinc oxide, magnesium oxide, calcium oxide, copper oxide, silver oxide, nickel oxide, chromium oxide, and mixtures thereof and (2) subsequently converting said composition into a product selected from the group consisting of shaped articles, films and coatings.

11. The method of claim 10 wherein the plasticizer is selected from the group consisting of dioctyl phthalate, di-2-ethylhexyl adipate, di-isodecyl phthalate, di-isooctyl phthalate, epoxidized soybean oil, 2-ethylhexyl diphenyl phosphate white oil and mixtures thereof.

12. The method of claim 11 wherein the polymer composition includes from about 200 to about 400 parts, per 100 parts homopolymer or copolymer, of a filler material selected from the group consisting of barium sulfate (barytes) talc, calcium carbonate, titanium dioxide, mica, clay, calcium carbonate coated with calcium stearate, and mixtures thereof per 100 parts of resin.

13. The method of forming a resinous gasket in a container closure comprising
   (a) depositing an amount of a plastisol in said closure, said plastisol composition comprising
      (1) 100 parts of a vinyl chloride resin component,
      (2) 50–300 parts of a plasticizer for said resin component, and
      (3) 0.1 to 50 parts of a metal oxide selected from the group consisting of aluminum oxide, zinc oxide, magnesium oxide, calcium oxide and mixtures thereof per 100 parts of resin component, and
   (b) heating the deposited plastisol composition to advance the plastisol to a fluxed state to form a gasket in said closure.

14. The method of claim 13 wherein the plasticizer is selected from the group consisting of dioctyl phthalate, di-2-ethylhexyl adipate, di-isodecyl phthalate, di-isooctyl phthalate, epoxidized soybean oil, 2-ethylhexyl diphenyl phosphate, white oil and mixtures thereof.

15. The method of claim 14 wherein the plastisol composition also includes from about 200 to about 400 parts of a filler per 100 parts of resin component, said filler being selected from the group consisting of barium sulfate (barytes) talc, calcium carbonate, titanium dioxide, mica, clay, calcium carbonate coated with calcium stearate and mixtures thereof per 100 parts of resin.

* * * * *